United States Patent [19]

DeCou et al.

[11] 4,234,792

[45] Nov. 18, 1980

[54] SCINTILLATOR CRYSTAL RADIATION DETECTOR

[75] Inventors: Donald F. DeCou, West Redding; Terence Roach, Fairfield, both of Conn.

[73] Assignee: Raytheon Company, Lexington, Mass.

[21] Appl. No.: 837,958

[22] Filed: Sep. 29, 1977

[51] Int. Cl.[2] .............................................. G01T 1/20
[52] U.S. Cl. ................................. 250/361 R; 250/366; 250/367; 250/368
[58] Field of Search ............... 250/361 R, 363 R, 368, 250/369, 370, 483, 366, 367, 445 T

[56] References Cited

U.S. PATENT DOCUMENTS

| 2,745,968 | 5/1956 | Ludeman | 250/483 |
| 3,068,359 | 12/1962 | Carlson | 250/361 |
| 3,790,799 | 2/1974 | Stein et al. | 250/363 |
| 4,070,581 | 1/1978 | Gibbons et al. | 250/445 T |

*Primary Examiner*—Davis L. Willis
*Attorney, Agent, or Firm*—John T. Meaney; Joseph D. Pannone

[57] ABSTRACT

A radiation detector, particularly suitable for use in computerized tomographic scanning systems, comprising a scintillator crystal having one window surface optically connected with a photodetector, preferably a semiconductor device, and having other surfaces diffused and tapered whereby the window surface is enabled to see all other surfaces so as to provide efficient passage of light photons from the crystal through the polished surface to the photodetector.

5 Claims, 11 Drawing Figures

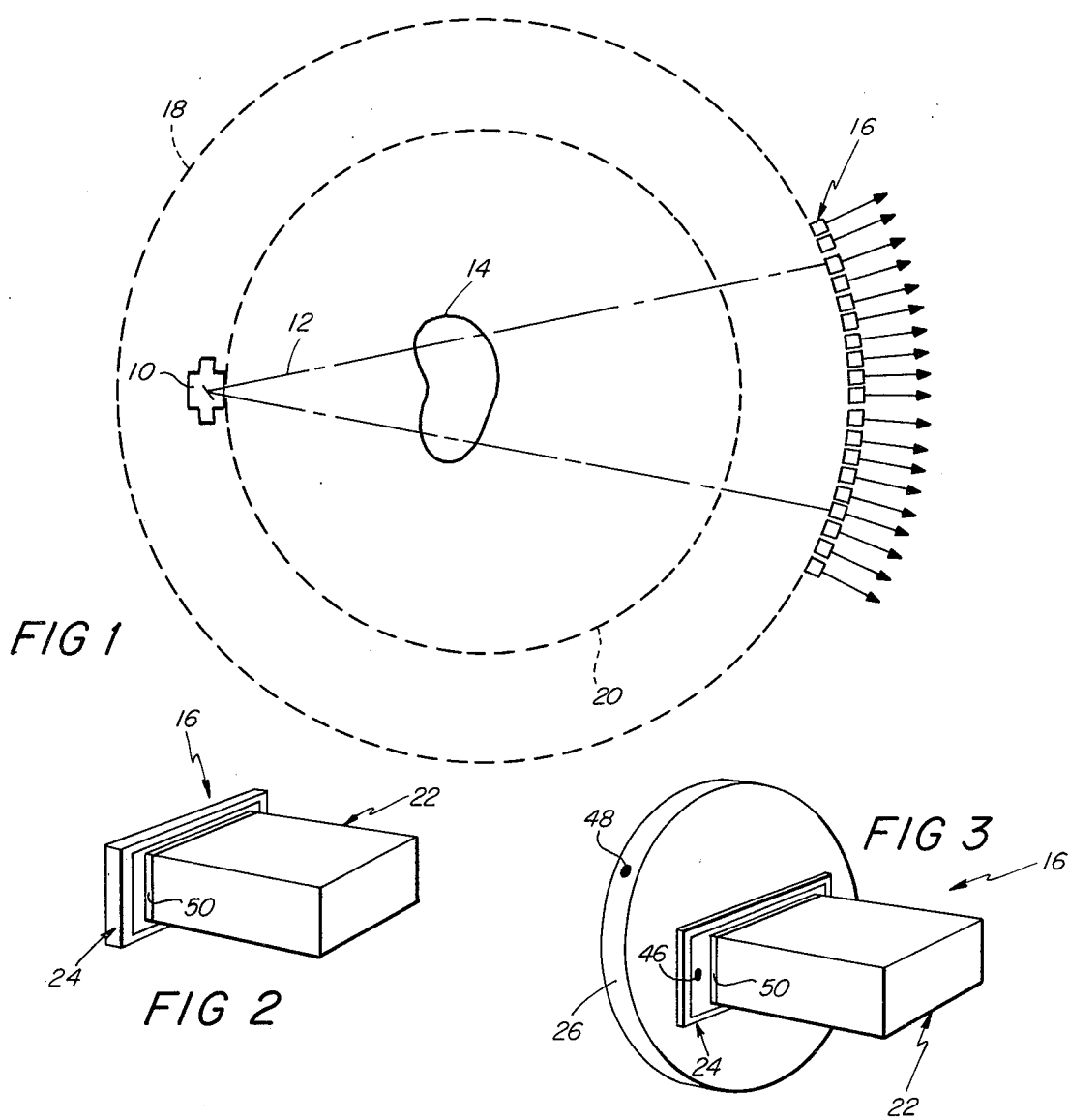
FIG 1
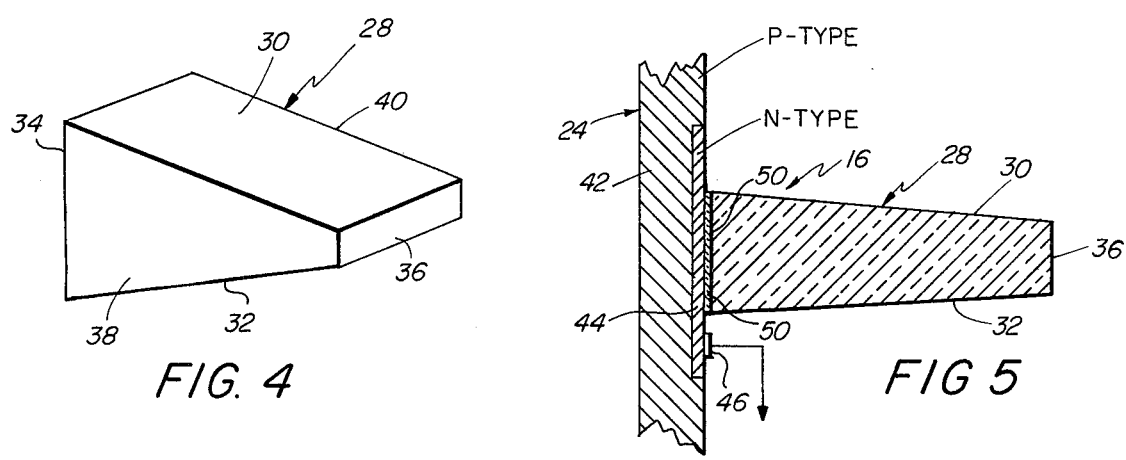
FIG 2
FIG 3
FIG. 4
FIG 5

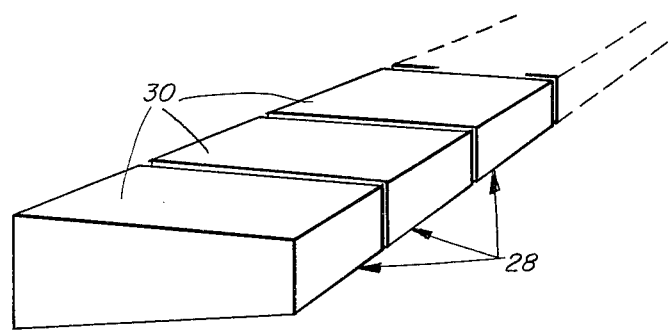
FIG 6
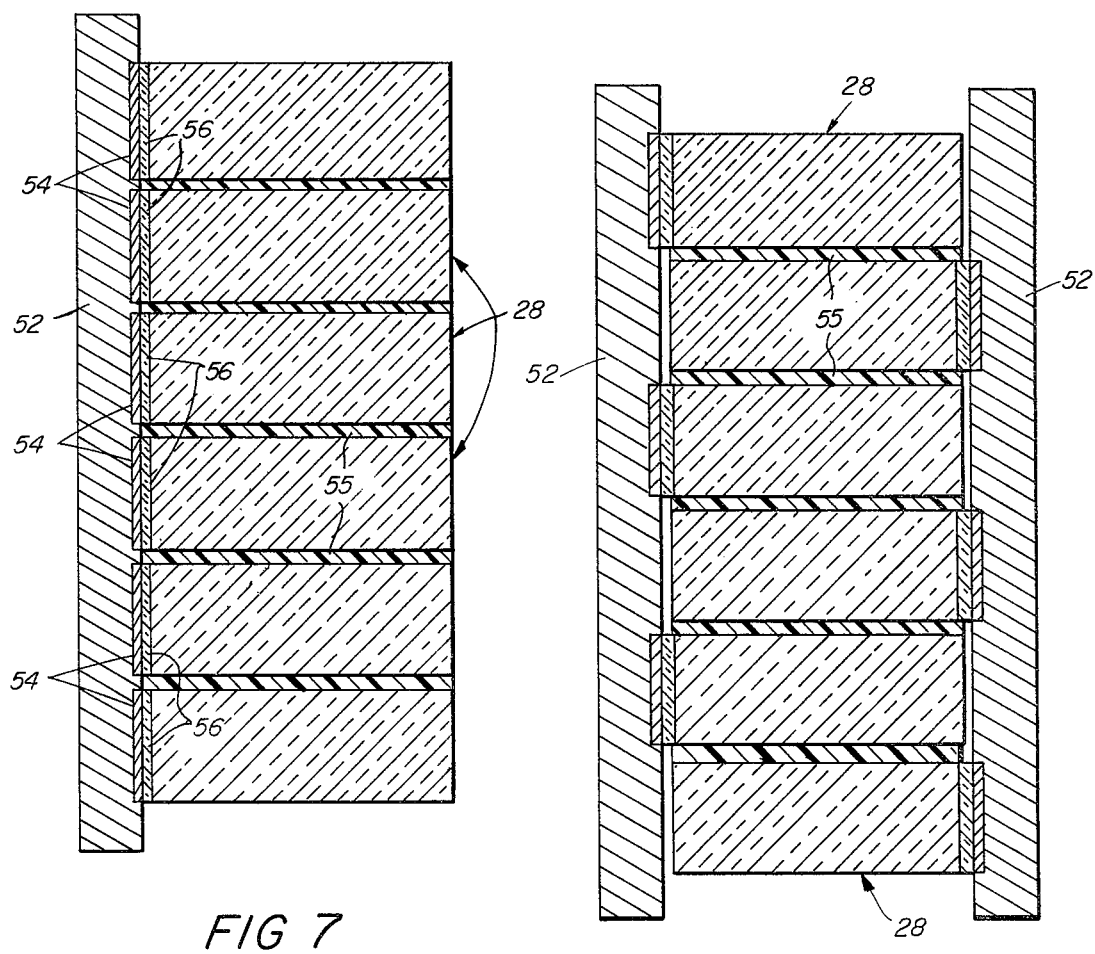
FIG 7
FIG 8

SIGNAL V OUT

SIGNAL I OUT

SCINTILLATOR CRYSTAL RADIATION DETECTOR

BACKGROUND OF THE INVENTION

In invisible radiation systems such as x-ray, gamma ray and other systems utilizing invisible radiation, it is often necessary to employ devices for detecting the invisible radiation and converting it to another form of energy such as electrical signals which may more easily adapted and controlled for subsequent utilization in the systems.

It has been common practice to employ an x-ray tube for producing an x-ray image and a fluoroscopic screen for detecting the x-ray image and converting it into a corresponding visible image. Also common in the art is the use of an image intensifier tube which has a fluorescent screen at one end which detects the x-ray image and converts it to a visible image, a photoemitter which converts the visible image to an electron image, and an output fluorescent screen which converts the electron image to a highly intensified visible image.

Other known invisible radiation detectors include devices based on scintillator crystals combined with photomultiplier tubes. The scintillator crystal functions to convert the radiation to visible light with the light sensitive photomultiplier tubes converting this light to an electrical signal. Suitable scintillator materials include materials such as sodium iodide, calcium fluoride, bismuth germanate or the like.

Another detector device which has been commonly used is an ionization chamber or tube containing a gas which becomes ionized by the invisible radiation with the tube producing electrical signals in response to such ionization.

Semiconductor devices have been made sensitive to invisible radiation such as x-rays or gamma rays by making them of lithium-drifted silicon or germanium so that their P-N junctions would be effectively activated by the penetrating radiation.

None of such prior art invisible radiation detectors is entirely suitable for use in systems such as computerized tomography for various reasons. Fluoroscopic screens and image intensifiers, are obviously unsuitable and do not produce electrical signals. Photomultiplier and ionization tubes are bulky and relatively inefficient. Semiconductor devices must be specially constructed and are relatively inefficient and noisy.

SUMMARY OF THE INVENTION

The present invention overcomes the problems associated with prior art invisible radiation detectors by providing simple and efficient means for detecting invisible radiation, converting it to light photons, and then to electrical signals in an efficient manner.

According to the invention, the detector comprises a scintillator crystal and a semiconductor P-N junction photodiode. The crystal has its surfaces provided with diffusing or reflection-enhancing means except for one optically prepared end surface which thus becomes a window. When one of the diffused surfaces is impinged by an x-ray beam, the beam will penetrate into the interior of the crystal and will cause light photons to be generated within the crystal by absorption of the radiation energy. These photons are scattered off the diffused surfaces and eventually pass out the end window of the crystal.

The crystal is affixed by its end window to the surface of the photodiode by an optical coupler and when the photons pass to the photodiode this will cause charge carriers to flow across the P-N junction in the normal manner of a photodiode. This creates an electrical signal which may be directed into the system, which signal corresponds to the intensity or flux of the initial radiation beam.

The crystal is sufficiently thick to absorb a substantial amount of the energy in the beam, and is shaped so that the end window sees all of the other light-scattering surfaces, providing optimum performance since the light flux collected by the photodiode is essentially a function of the relationship of window area to scintillator volume. The scintillator area "seen" by the incident radiation beam may be the size of a picture element or pixel. The crystal can be made relatively small to conform to the size or shape of a beam, thus enabling a plurality of the crystals to be grouped in an array for efficient scanning. Furthermore, such detectors can be provided with shields to prevent portions from becoming undesirably irradiated, thus permitting only the scintillator crystal or crystals to be subjected to the radiation and preventing damage to the photodiode and optical coupler.

BRIEF DESCRIPTION OF THE DRAWINGS

The above and other objectives of the invention will become apparent from the following description taken in connection with the accompanying drawings, wherein:

FIG. 1 is a diagrammatic illustration of a system for scanning a subject with invisible radiation, including detecting means embodying the invention;

FIG. 2 is an isometric view of a detector embodying the invention;

FIG. 3 is an isometric view of the detector of FIG. 2 mounted on a supporting base;

FIG. 4 is an isometric view of a scintillator crystal having a preferred shape;

FIG. 5 is a vertical sectional view of a detector embodying a preferred form of the invention;

FIG. 6 is a perspective view of a partial array of detectors;

FIG. 7 is a plan view of an array of detectors;

FIG. 8 is a plan view of an array of detectors arranged in interdigitated fashion;

DESCRIPTION OF THE PREFERRED EMBODIMENTS

Figure 9:
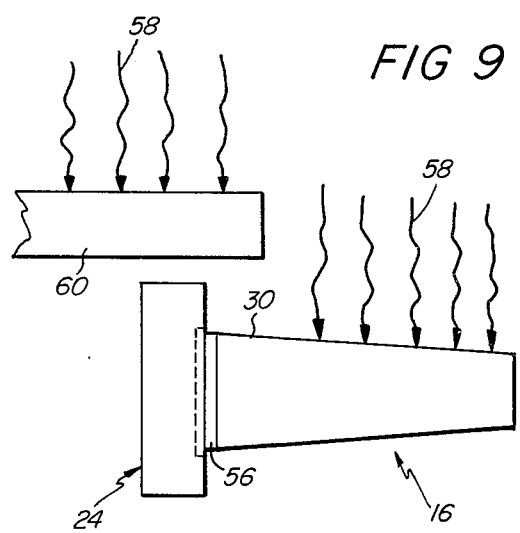
FIG. 9 is a side elevational view of a shielded detector.

In radiating systems such as computerized tomographic x-ray scanning systems, for example, it is important that detectors be utilized which will efficiently receive an x-ray beam of predetermined cross-sectional configuration and convert the beam to a corresponding electrical signal. Such an exemplary system is disclosed in FIG. 1 and comprises, briefly, an x-ray tube 10 which produces a beam 12 of x-radiation which passes through a subject 14. The beam 12 may be collimated by any suitable means so as to have a selected cross-sectional configuration. For example, the beam may be pencil shaped or fan shaped, as shown in FIG. 1.

When the beam 12 passes through the subject it will be modulated by portions of the subject which have different x-ray absorption characteristics. The modulated beam impinges upon one or more detectors 16 in an array thereof, and, due to the fact that the flux or intensity of the beam is altered by the subject, the detectors 16 will consequently produce correspondingly different electrical signals.

The detector array may be arranged in circular fashion around the subject as indicated by dotted line 18 or made to occupy segments of a circle, and the x-ray tube is mounted for movement in a circle 20 around the subject so that a slice of the subject is irradiated from all angles. Thus, from the signals generated by the detectors, an image can be produced as is well known in systems of the character.

The detectors 16 comprise the substance of this invention, each detector 16 including a scintillator crystal 22 (FIG. 2) which is mounted upon a photodiode 24. As shown in FIG. 3, the photodiode may be supported in a suitable manner upon a base 26 of electrically conductive material such as copper, for example.

The scintillator crystal 22 is a block of material which scintillates or fluoresces when subjected to invisible radiation such as x-rays or gamma rays. Materials suitable for use as scintillators include cadmium sulphide, cadmium tungstate, bismuth germanate, calcium tungstate, calcium fluoride, cesium iodide, sodium iodide and gadolinium oxysulphide, all of which are crystalline materials. Known plastic scintillating materials such as paraterphenyl combined with polystyrene, or 1; 1; 4; 4-tetraphenylbutadiene-1; 3 in polystyrene may also be used.

The scintillator crystal 22 may be a crystalline block having rectangular, parallel and equal opposed top and bottom surfaces, rectangular, parallel and equal opposed side surfaces, and rectangular parallel and equal opposed end surfaces as shown in FIG. 2. All surfaces except one end surface of the crystal are roughened or coated so as to provide efficient diffusion or internal reflection characteristics. The end surface 34 which is disposed adjacent the photodiode 24 is optically prepared and thus forms an efficient window for escape of internally generated light photons. A preferable configuration, however, for the scintillator crystal in accordance with this invention is shown in FIGS. 4 and 5 wherein a crystal 28 is provided with a taper achieved by converging the upper and lower surfaces 30 and 32 respectively away from the window end surface 34 toward the opposed smaller end surface 36. The opposed side surfaces 38 and 40 are equal and parallel.

In accordance with this invention the top and bottom inclined surfaces 30 and 32 are etched or otherwise pitted or roughened to provide them with diffusing characteristics, as are the side surfaces 38 and 40 and the smaller end surface 36. Such diffused surfaces enhance the collection of light photons, which photons are generated within the crystal when the crystal is subjected to x-radiation. Instead of roughening the surfaces, they may be provided with reflection enhancing coatings such as silicon oxide, magnesium fluoride or aluminum. The window end surface 34 is polished or otherwise optically prepared and hence readily transmits light. Window 34 is, according to this invention, able to "see" all of the other surfaces and, accordingly, the internally generated light photons will bounce around within the crystal and eventually substantially all of such light will pass out of the crystal through the window 34.

While a crystal 22 as shown in FIG. 4 provides considerable improvement over known detectors which respect to optimizing the escape of light photons toward the photodiode, the crystal shape shown in FIG. 4 is preferred and has been found to be more efficient. It will be apparent that other crystal shapes may be utilized.

The photodiode 24 (FIG. 5) is a shallow P-N junction device having no unusual characteristics. Such a device comprises a matrix of semiconductor material, silicon or germanium, of known P- or N-type conductivity having a dopant diffused into its surface to provide a region 44 of opposite conductivity type. Thus, for example, a P-type body 42 is provided with an N-type region 44 producing a P-N junction which lies relatively close to but beneath the surface. A typical photodiode is the UV 444B sold by Edgerton, Germeshausen and Grier of Boston, Mass.

The photodiode is photovoltaic and will inherently produce current without external bias. When the N-surface is impinged by light photons, charge carriers will flow across the junction, producing current. One electrical connection 46 may be made to the N-region 44 and the other connection 48 may be made to whatever base the photodiode 24 may be mounted on, such as base 26 in FIG. 3, for example, and may be made in any conventional and convenient manner so that electrical signals are produced corresponding to the light flux which engages the N-region. It is to be understood that the photodiode 24 is conventional and that the P- and N-type materials may be interchanged without interfering with the operation of the device.

The window surface 34 of the scintillator crystal 28 is fixedly secured to the surface of the photodiode N-region 44 by an optical coupler 50 which may be a silicone or epoxy resin which must securely adhere to the surfaces of the elements and which is transparent to light photons which pass from the interior of the crystal to the photodiode.

As shown in FIG. 6, the crystals 28 may be disposed in side by side relation to form an array such as a linear, circular or segmented configuration shown in FIG. 1 with the inclined surfaces 30 being directed toward the source of radiation. As shown in more detail in FIG. 7, the array may comprise a selected number of scintillator crystals 28 all mounted on respective photodiodes formed as an array on a common substrate 52. The photodiode array 52 comprises an elongated chip of germanium or silicon of known conductivity type in which are disposed spaced regions 54 of opposite conductivity type. To each opposite conductivity type region 54 is attached the window end surface of a respective scintillator crystal 28, this being achieved by optical couplers 56 as described hereinbefore. It will be understood that separate electrical connections must be made to each individual opposite conductivity type region 54, with one connection only being made to the base region of the array 52.

Referring now to FIG. 8, there is illustrated an embodiment wherein two separate spaced photodiodes arrays 52 are provided with crystals 28 disposed between them. In this construction alternate crystals 28 are respectively mounted on the two photodiode arrays 52 as shown to provide an interdigital structure. In the structure of either FIG. 7 or FIG. 8 the spaces between crystals will preferably be filled with material 55 essentially opaque to visible light and x-rays to prevent visible light and x-rays escaping from one crystal and passing into an adjacent crystal giving rise to erroneous signals. The material 55 will also provide a reflective surface adjacent the scintillator crystal to provide further improvement in the light collection efficiency.

A single detector 16 may be provided with shielding to prevent damage to the photodiode 24 by the penetrating radiation. For example, a detector 16 is shown in FIG. 9 in a position where its upper surface 30 is subjected to x-rays 58 or other invisible radiation. A shield 60 such as a lead plate or similar member opaque to the radiation is disposed in overlying relation to the photodiode 24 and the optical coupler 56 to protect same from the radiation.

Figure 10:
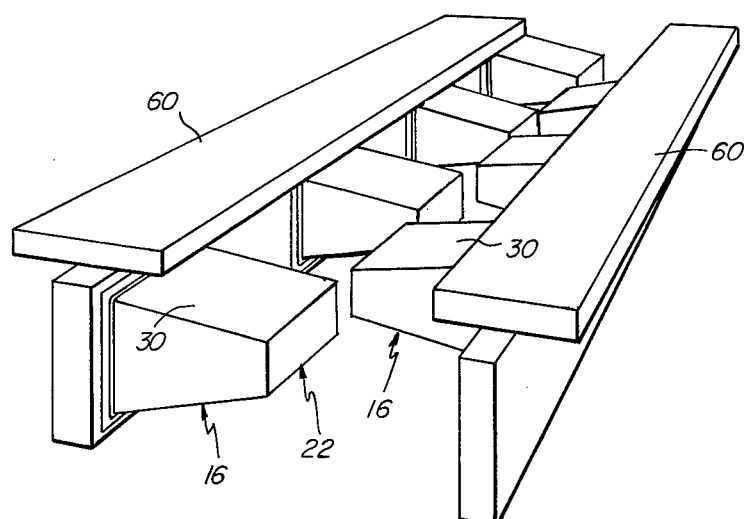
FIG. 10 is a perspective view of a shielded interdigitated array of detectors.

It will be apparent that such shields 60 may be similarly disposed in the cases where arrays of detectors are used, as shown in FIG. 10. A scintillator crystal 22 will generate light photons, as described above, when engaged by the selected radiation. Such photons will pass to the photodiode (FIG. 11) which will generate current in proportion to the light flux upon the photodiode. The current is transmitted to an operational amplifier 62.

The photodiode 24, when operated in the photo-voltaic or self biased mode is a current source with output current proportional to input light flux. When operated in this mode the photodiode exhibits excellent response linearity. However, it must be terminated in a low impedance load. This is necessary to prevent the subtractive effect that a developed signal voltage would have on the self biased status of the device. The operational amplifier 62 used as a photodiode interface element results in the low impedance photodiode load. This comes about from a characteristic of the amplifier circuitry that yields a current sink or virtual ground at the inverting input terminal. This has the added advantage of reducing the undesirable effects of the photodiode junction capacitance on the system frequency response.

The output from the operational amplifier 62 passes as voltage to a buffer amplifier 64 which adjusts the gain to the desired sensitivity, the buffer amplifier output then being transmitted to a computerized display system as is well known.

Figure 11:
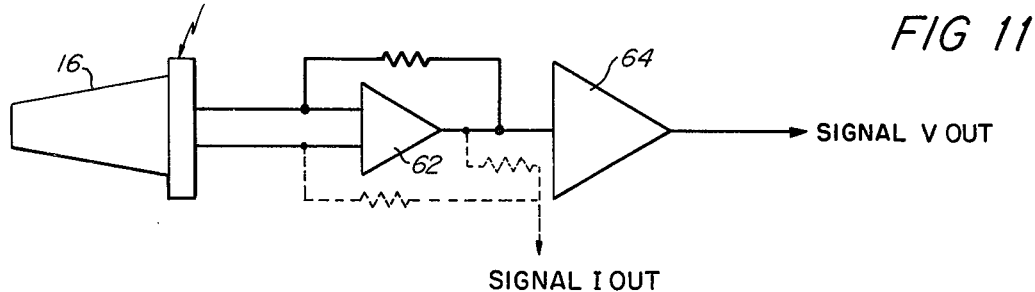
FIG. 11 is a schematic diagram of a circuit for producing current or voltage from energy collected by the scintillator crystal in accordance with this invention.

When connected as shown by solid lines in FIG. 11, the circuit functions as a current to voltage converter. This basic circuit can be modified, however, by the addition of a sampling resistor as shown by dotted lines to operate as a current to current interface. It is obvious that other electronic circuitry may be used to provide the required interface functions.

From the foregoing it will be apparent that all of the objectives of this invention have been achieved in the novel detector shown and described. However, it will be understood that various modification and changes in the invention shown and described may be made by those skilled in the art without departing from the spirit of the invention as expressed in the accompanying claims. Therefore, all matter shown and described is to be interpreted as illustrative and not in a limiting sense.

What is claimed is:

1. An invisible radiation detector comprising a scintilator crystal of material capable of scintillating when subjected to a beam of invisible radiation, and a photodiode mounted on one end surface of said crystal, said crystal also having an opposed end surface, said one end surface of the crystal having means for enhancing the passage of light photons from the crystal to the photodiode, the remaining surfaces of the crystal being provided with means for enhancing the collection of light photons generated within the crystal, said crystal having one selected surface directed toward said radiation and an opposed surface, said selected and opposed surfaces having adjacent ends disposed adjacent said photodiode, and said selected and opposed surfaces being convergently inclined in a direction away from said photodiode.

2. An invisible radiation detector comprising a scintilator crystal of material capable of scintillating when subjected to a beam of invisible radiation, and a photodiode mounted on one end surface of said crystal, said crystal also having an opposed end surface, said one end surface of the crystal having means for enhancing the passage of light photons from the crystal to the photodiode, the remaining surfaces of the crystal being provided with means for enhancing the collection of light photons generated within the crystal, said one end surface being larger than the opposed end surface and being polished to form a highly light transparent window, said one end surface being affixed to said photodiode whereby light photons generated within the crystal will pass through the window to the photodiode.

3. An x-ray detector assembly for converting a beam of x-rays to corresponding electrical signals comprising a scintillator crystal of material capable of generating light photons when subjected to x-rays, and a photodiode capable of generating current when subjected to light photons, said crystal having two broad side surfaces opposing one another, two narrow edge surfaces connecting adjoining edges of said broad surfaces, and two opposed end surfaces, one of said broad surfaces being selected for impingement by said beam of x-rays and one end surface being secured to said photodiode, said one end surface being provided with means for enhancing the passage of light photons from the crystal to the photodiode, and the remaining surfaces of the crystal being provided with means for enhancing the collection of light photons generated within the crystal, and means for transmitting from the photodiode current generated by the reception of light photons from the crystal.

4. An x-ray detector assembly as set forth in claim 3 wherein said one end surface of the crystal is polished, and the remaining surfaces of the crystal are provided with light diffusing characteristics.

5. An x-ray detector assembly as set forth in claim 3 wherein said one selected surface of the crystal and the opposing surface are convergently inclined in a direction away from the photodiode.

* * * * *

UNITED STATES PATENT OFFICE
CERTIFICATE OF CORRECTION

Patent No. 4,234,792             Dated November 18, 1980

Inventor(s) Donald F. DeCou and Terence Roach

It is certified that error appears in the above-identified patent and that said Letters Patent are hereby corrected as shown below:

On Cover Sheet, Item [73] Assignee:, change "Raytheon Company, Lexington, Mass." to --The Machlett Laboratories, Inc., Springdale, Conn.--.

Signed and Sealed this

Fifth Day of October 1982

[SEAL]

Attest:

Attesting Officer

GERALD J. MOSSINGHOFF

Commissioner of Patents and Trademarks